US012792804B2

(12) United States Patent
Baek

(10) Patent No.: US 12,792,804 B2
(45) Date of Patent: Nov. 10, 2026

(54) OPERATING METHOD OF ELECTRONIC DEVICE SIMULATING DESIGN OF INTEGRATED CIRCUIT

(71) Applicant: SAMSUNG ELECTRONICS CO., LTD., Suwon-si (KR)

(72) Inventor: Hyun-Chul Baek, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 860 days.

(21) Appl. No.: 18/126,128

(22) Filed: Mar. 24, 2023

(65) Prior Publication Data

US 2024/0028804 A1 Jan. 25, 2024

(30) Foreign Application Priority Data

Jul. 25, 2022 (KR) ........................ 10-2022-0091563

(51) Int. Cl.

*G06F 30/3323* (2020.01)
*G06F 30/3308* (2020.01)
*G06F 119/06* (2020.01)

(52) U.S. Cl.

CPC ...... *G06F 30/3323* (2020.01); *G06F 30/3308* (2020.01); *G06F 2119/06* (2020.01)

(58) Field of Classification Search

CPC ............. G06F 30/3323; G06F 30/3308; G06F 2119/06
USPC .......................................................... 716/100
See application file for complete search history.

(56) References Cited

U.S. PATENT DOCUMENTS

| | | | | |
|---|---|---|---|---|
| 7,596,769 | B2 | 9/2009 | Chen | |
| 8,365,132 | B2 | 1/2013 | Hsu et al. | |
| 8,635,572 | B1 | 1/2014 | Jin et al. | |
| 8,832,615 | B2 | 9/2014 | Hsieh et al. | |
| 9,058,440 | B1 | 6/2015 | Kolpekwar | |
| 9,268,901 | B1 * | 2/2016 | Sood | G06F 30/398 |
| 9,679,097 | B2 | 6/2017 | Srivastava | |

(Continued)

FOREIGN PATENT DOCUMENTS

KR 10-2018-0055143 A 5/2018

OTHER PUBLICATIONS

Anonymous, "Verifying Low-Power Implementation in SoCs Containing Multiple Power Domains", IP.com, Aug. 4, 2010, 7 total pages.

(Continued)

*Primary Examiner* — Suchin Parihar
(74) *Attorney, Agent, or Firm* — Sughrue Mion, PLLC

(57) ABSTRACT

Disclosed is an operating method of an electronic device which simulates a design of an integrated circuit. The method includes detecting, at the electronic device, a power domain structure of the integrated circuit from a register transfer level (RTL) model of the integrated circuit, detecting, at the electronic device, current isolation values of ports of the integrated circuit from the power domain structure of the integrated circuit and an unified power format (UPF) of the integrated circuit, detecting, at the electronic device, reference isolation values of the ports of the integrated circuit, detecting, at the electronic device, reset values of the ports of the integrated circuit, and checking, at the electronic device, isolation errors of the ports of the integrated circuit based on the current isolation values, the reference isolation values, and the reset values.

20 Claims, 12 Drawing Sheets

(56) References Cited

U.S. PATENT DOCUMENTS

| | | | | |
|---|---|---|---|---|
| 10,289,773 | B2 | 5/2019 | Shah et al. | |
| 10,637,462 | B1 * | 4/2020 | Pulipati | H03K 19/01759 |
| 11,119,153 | B1 | 9/2021 | Srinivasan | |
| 11,442,108 | B1 * | 9/2022 | Srinivasan | G01R 31/31701 |
| 2006/0064293 | A1 * | 3/2006 | Kapoor | G06F 30/30 703/18 |
| 2008/0127015 | A1 * | 5/2008 | Chandramouli | G06F 30/33 716/109 |
| 2010/0192115 | A1 | 7/2010 | Yang et al. | |
| 2012/0159060 | A1 * | 6/2012 | Yu | G06F 11/1456 711/105 |
| 2012/0198408 | A1 | 8/2012 | Chopra | |
| 2013/0238916 | A1 * | 9/2013 | Dohm | G06F 1/32 713/320 |
| 2014/0013293 | A1 * | 1/2014 | Hsu | G06F 30/33 716/133 |
| 2017/0011138 | A1 | 1/2017 | Venkatesh et al. | |
| 2018/0004876 | A1 * | 1/2018 | Shah | G06F 30/33 |
| 2018/0136713 | A1 | 5/2018 | Kim et al. | |
| 2020/0372196 | A1 * | 11/2020 | Bhowmick | G06F 30/333 |
| 2021/0255682 | A1 * | 8/2021 | Balasubramanian | G06F 1/266 |
| 2022/0207225 | A1 * | 6/2022 | Pattanayak | G06F 30/347 |

OTHER PUBLICATIONS

Kalnoskas, "Understanding low-power checks and how to use them", Power Electronic Tips, Jul. 15, 2019, 8 total pages.

* cited by examiner

FIG. 12

| | | | | | |
|---|---|---|---|---|---|
| Port ID | | | | ... | |
| Current Isolation Value | | | | ... | |
| Reference Isolation Value | | | | ... | |
| Reset Value | | | | ... | |

OPERATING METHOD OF ELECTRONIC DEVICE SIMULATING DESIGN OF INTEGRATED CIRCUIT

CROSS-REFERENCE TO RELATED APPLICATIONS

This application is based on and claims priority under 35 U.S.C. § 119 to Korean Patent Application No. 10-2022-0091563 filed on Jul. 25, 2022, in the Korean Intellectual Property Office, the disclosures of which are incorporated by reference herein in their entireties.

BACKGROUND

1. Field

The disclosure relates to an electronic device, and more particularly, to an operating method of an electronic device simulating a design of an integrated circuit and checking an isolation error of the integrated circuit.

2. Description of Related Art

The integrated circuit may be designed by combining various intellectual property (IP) circuits (e.g., circuits registered as an IP). In the integrated circuit, different IP circuits may belong to different power domains, or two or more IP circuits may belong to the same power domain. In addition, one IP circuit may be designed to be implemented in two or more power domains. The integrated circuits belonging to different power domains may communicate with each other through ports. For example, a circuit in the first power domain and a circuit in the second power domain may communicate with each other through respective ports.

The power consumption of the integrated circuit may be reduced by turning on or turning off the powers of the power domains independently of each other. However, when one of a plurality of power domains in the integrated circuit is powered off, the remaining power domains may be isolated from the powered-off power domain. For example, when the first power domain is powered off, ports that are used for the first power domain and the second power domain to communicate should isolate the power domains. To this end, isolation cells may be placed at the ports between the two power domains. Isolation cells may isolate the two power domains by fixing signals of the ports to fixed values of "1" or "0". However, if the isolation values of the isolation cells are incorrectly specified, the circuit of the second power domain may be affected by the first power domain, which is powered off, and may abnormally operate. Accordingly, it is necessary to test the isolation values of the isolation cells. However, related art methods of testing the isolation values of the isolation cells require a long time and a lot of computation resources such as memory and processing resources.

SUMMARY

One or more example embodiments of the disclosure provides an operating method of an electronic device quickly checking an isolation error capable of occurring when one power domain is isolated.

According to an aspect of the disclosure, there is provided an operating method of an electronic device including at least one processor, which simulates a design of an integrated circuit, the method including: obtaining, by the at least one processor, a power domain structure of the integrated circuit from a register transfer level (RTL) model of the integrated circuit, obtaining, by the at least one processor, current isolation values of a plurality of ports of the integrated circuit from the power domain structure of the integrated circuit and an unified power format (UPF) of the integrated circuit, obtaining, by the at least one processor, reference isolation values of the plurality of ports of the integrated circuit, obtaining, by the at least one processor, reset values of the plurality of ports of the integrated circuit; and checking, by the at least one processor, isolation errors of the plurality of ports of the integrated circuit based on the current isolation values, the reference isolation values, and the reset values.

According to another aspect of the disclosure, there is provided an operating method of an electronic device including at least one processor, which simulates a design of an integrated circuit, the method including: obtaining, by the at least one processor, a power domain structure of the integrated circuit from a register transfer level (RTL) model of the integrated circuit; obtaining, by the at least one processor, current isolation values of a plurality of ports of the integrated circuit from the power domain structure of the integrated circuit and an unified power format (UPF) of the integrated circuit; obtaining, by the at least one processor, reference isolation values of the plurality of ports of the integrated circuit; and checking, by the at least one processor, isolation errors of the plurality of ports of the integrated circuit based on a difference between the current isolation values and the reference isolation values.

According to another aspect of the disclosure, there is provided an operating method of an electronic device including at least one processor, which simulates a design of an integrated circuit, the method comprising: obtaining, by the at least one processor, a power domain structure of the integrated circuit from a register transfer level (RTL) model of the integrated circuit; obtaining, by the at least one processor, current isolation values of a plurality of ports of the integrated circuit from the power domain structure of the integrated circuit and an unified power format (UPF) of the integrated circuit; obtaining, by the at least one processor, reset values of the plurality of ports of the integrated circuit; and checking, by the at least one processor, isolation errors of the plurality of ports of the integrated circuit based on a difference between the current isolation values and the reset values.

BRIEF DESCRIPTION OF DRAWINGS

The above and other objects and features of the disclosure will become apparent by describing in detail embodiments thereof with reference to the accompanying drawings.

FIG. 12 is a diagram illustrating an example of a method where a simulation module executed by processors shows a result of checking isolation errors according to an example embodiment.

DETAILED DESCRIPTION

Below, embodiments of the disclosure will be described in detail and clearly to such an extent that an ordinary one in the art easily implements the disclosure. Below, the term "and/or" is interpreted as including any one of items listed with regard to the term, or a combination of some of the listed items.

Figure 1:
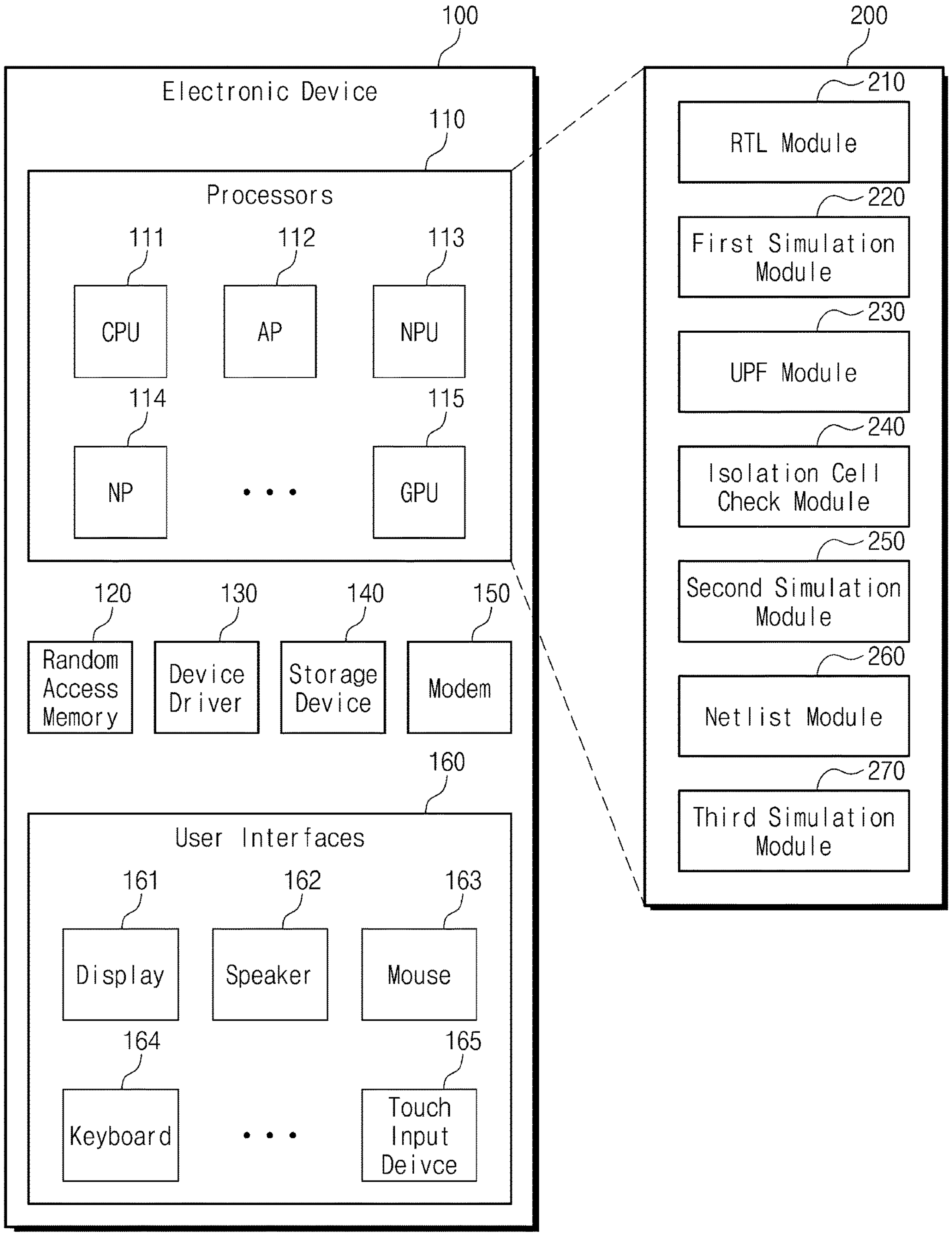
FIG. 1 is a block diagram illustrating an electronic device according to an example embodiment of the disclosure.

FIG. 1 is a block diagram illustrating an electronic device 100 according to an example embodiment of the disclosure. Referring to FIG. 1, the electronic device 100 may include processors 110, a random access memory (RAM) 120, a device driver 130, a storage device 140, a modem 150, and user interfaces 160.

The processors 110 may include, for example, at least one general-purpose processor such as a central processing unit (CPU) 111 or an application processor (AP) 112. Also, the processors 110 may further include at least one special-purpose processor such as a neural processing unit (NPU) 113, a neuromorphic processor 114, or a graphics processing unit (GPU) 115. The processors 110 may include two or more homogeneous processors.

According to an example embodiment, at least one of the processors 110 may implement or drive a simulation module 200. For example, the simulation module 200 may be implemented in the form of instructions (or codes) that are executed by at least one of the processors 110. In this case, the at least one processor may load the instructions (or codes) of the simulation module 200 to the random access memory 120.

According to another example embodiment, at least one processor among the processors 110 may be manufactured to implement the simulation module 200. For example, the at least one processor may be a dedicated processor that implements functions of the simulation module 200 by a hardware circuitry, which may be different from the at least one processor above implementing the simulation module 200 by executing the software instructions (or codes).

The random access memory 120 may be used as a working memory of the processors 110 and may be used as a main memory or a system memory of the electronic device 100. The random access memory 120 may include a volatile memory such as a dynamic random access memory or a static random access memory, or a nonvolatile memory such as a phase-change random access memory, a ferroelectric random access memory, a magnetic random access memory, or a resistive random access memory.

The random access memory 120 may store codes of sub-modules included in the simulation module 200 and/or design models (e.g., information about the design of the integrated circuit) of the integrated circuit necessary for the simulation of the simulation module 200. For example, the random access memory 120 may receive the codes of the sub-modules included in the simulation module 200 and/or the design models of the integrated circuit through the modem 150 from the storage device 140 or an external device (e.g., a database).

The device driver 130 may control one or more of the peripheral devices depending on a request of the processors 110. For example, the device driver 130 may control the storage device 140, the modem 150, and the user interfaces 160. The storage device 140 may include a stationary storage device such as a hard disk drive or a solid state drive, or a removable storage device such as an external hard disk drive, an external solid state drive, or a removable memory card.

The storage device 140 may store original codes of the sub-modules included in the simulation module 200 and/or the design models of the integrated circuit necessary for the simulation of the simulation module 200. The original codes of the sub-modules included in the simulation module 200 and/or the design models of the integrated circuit, which are stored in the storage device 140, may be loaded to the random access memory 120 and may be used for the simulation of the simulation module 200.

The modem 150 may provide remote communication with the external device. The modem 150 may perform wired or wireless communication with the external device. The modem 150 may communicate with the external device based on at least one of various communication schemes such as Ethernet, wireless-fidelity (Wi-Fi), long term evolution (LTE), and 5G mobile communication. The modem 150 may receive the codes of the sub-modules included in the simulation module 200 and/or the design models of the integrated circuit necessary for the simulation of the simulation module 200 from the external device, for example, the database. The modem 150 may load the received images to the random access memory 120.

The user interfaces 160 may receive information from a user and may provide information to the user. The user interfaces 160 may include at least one user output interface such as a display 161 or a speaker 162, and at least one user input interface such as a mouse 163, a keyboard 164, or a touch input device 165.

The instructions (or codes) of the simulation module 200 may be received through the modem 150 and may be stored in the storage device 140. The instructions (or codes) of the simulation module 200 may be stored in a removable storage device, and the removable storage device may be connected with the electronic device 100. The instructions (or codes) of the simulation module 200 may be loaded and executed to the random access memory 120 from the storage device 140.

The simulation module 200 may be executed (or implemented) by one or more of the processors 110 and may perform the simulation of the design models of the integrated circuit. The simulation module 200 may include a register transfer level (RTL) module 210, a first simulation module 220, an unified power format (UPF) module 230, an isolation cell check module 240, a second simulation module 250, a netlist module 260, and a third simulation module 270.

Figure 2:
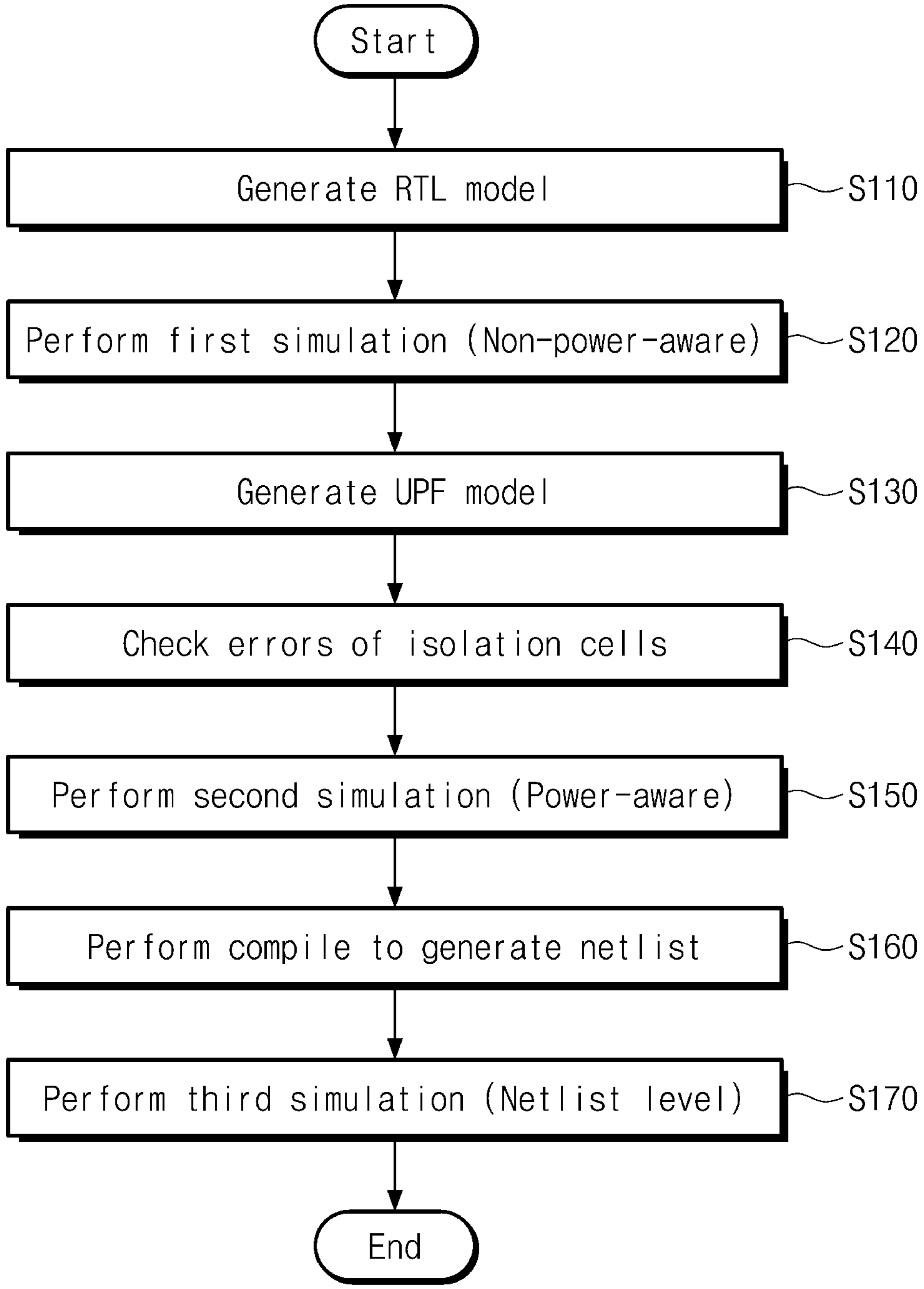
FIG. 2 is a diagram illustrating an example of an operating method of an electronic device of FIG. 1 according to an example embodiment.

FIG. 2 is a diagram illustrating an example of an operating method of the electronic device 100 of FIG. 1 according to an example embodiment. Referring to FIGS. 1 and 2, in operation S110, the RTL module 210 of the simulation module 200 that is executed by at least one of the processors 110 in the electronic device 100 may generate an RTL model. The RTL model may describe the design of the integrated circuit at a register transfer level.

In operation S120, the first simulation module 220 of the simulation module 200 that is executed by at least of the processors 110 in the electronic device 100 may perform first simulation on the RTL model. For example, the first simulation may refer to a non-power-aware simulation. The non-power-aware simulation may be performed without information about a power intent of the integrated circuit.

In operation S130, the UPF module 230 of the simulation module 200 that is executed by at least one of the processors 110 in the electronic device 100 may generate an UPF of the integrated circuit. The UPF may describe the power intent of the integrated circuit. Also, the UPF may describe a behavior of each of power domains of the integrated circuit.

In operation S140, the isolation cell check module 240 of the simulation module 200 that is by at least one of the processors 110 executed in the electronic device 100 may check errors of isolation cells of the integrated circuit.

In operation S150, the second simulation module 250 of the simulation module 200 that is executed by at least one of the processors 110 in the electronic device 100 may perform second simulation based on the RTL model and the UPF of the integrated circuit. The second simulation may refer to a power-aware simulation. The second simulation may be performed based on the power intent and the behavior of each power domain of the integrated circuit.

In operation S160, the netlist module 260 of the simulation module 200 that is executed by at least one of the processors 110 in the electronic device 100 may generate a netlist by performing compile on the RTL model and the UPF. For example, the netlist may include power information (or feature).

In operation S170, the third simulation module 270 of the simulation module 200 that is executed by at least one of the processors 110 in the electronic device 100 may perform third simulation of a netlist level. The third simulation-completed netlist may be used to manufacture the integrated circuit.

As described above, according to an example embodiment, the checking of the errors of the isolation cells may be performed independent of the second simulation, which is a power-aware simulation. Accordingly, the time taken to check the errors of the isolation cells may be shortened. Also, because the power-aware simulation scenario is not required, errors are capable of being consistently checked without depending on the experience or ability of an operator that creates the simulation scenario.

Figure 3:
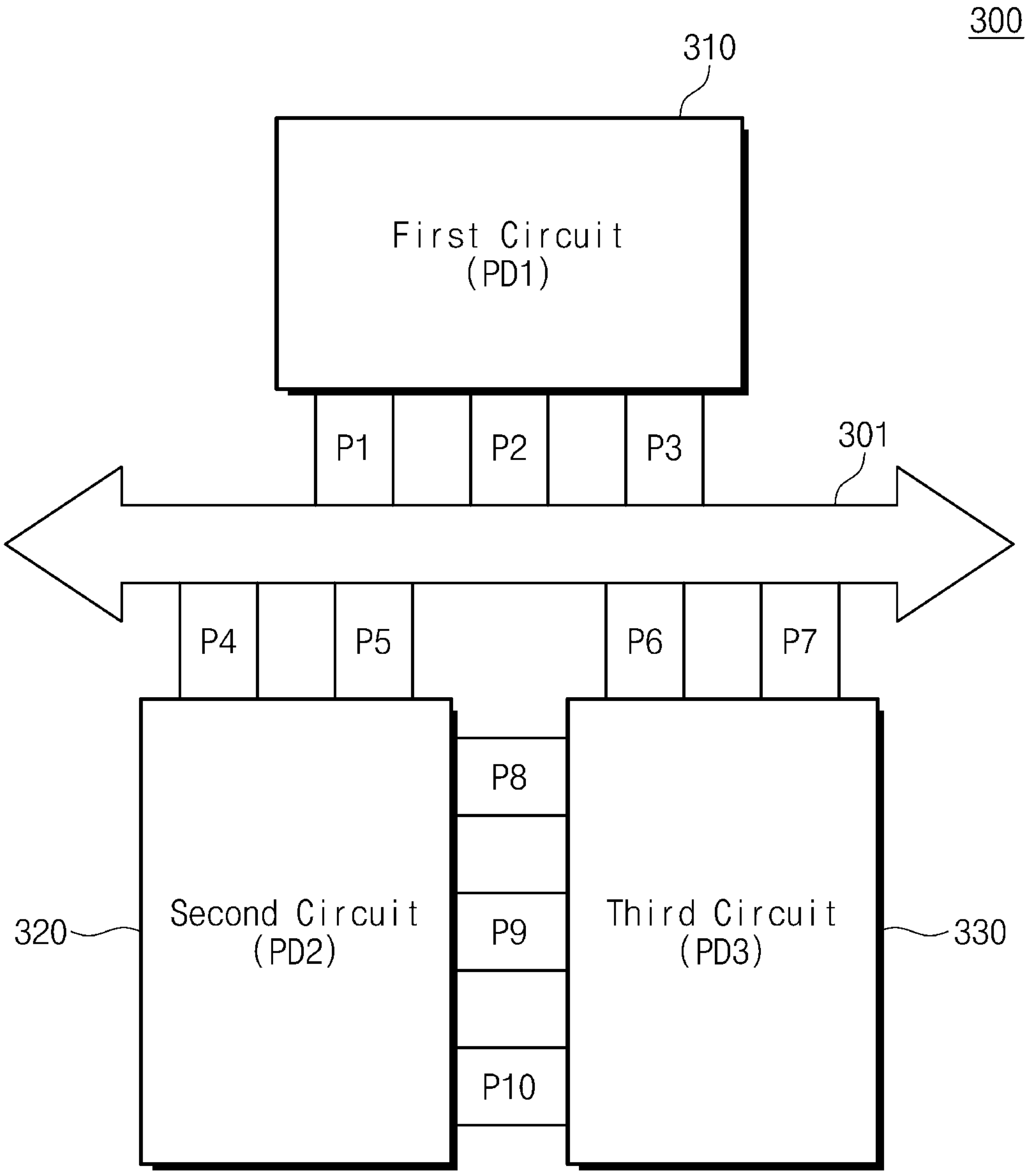
FIG. 3 is a diagram illustrating an example of an integrated circuit.

FIG. 3 is a diagram illustrating an example of an integrated circuit 300. Referring to FIG. 3, the integrated circuit 300 may include a bus 301, a first circuit 310, a second circuit 320, and a third circuit 330.

The first circuit 310 may belong to a first power domain PD1. The first circuit 310 may be connected with the bus 301 through a first port P1, a second port P2, and a third port P3 and may communicate with the bus 301 through the first port, the second port P2, and the third port P3.

The second circuit 320 may belong to a second power domain PD2. The second circuit 320 may be connected with the bus 301 through a fourth port P4 and a fifth port P5 and may communicate with the bus 301 through the fourth port P4 and the fifth port P5. The second circuit 320 may be connected with the third circuit 330 through an eighth port P8, a ninth port P9, and a tenth port P10 and may communicate with the third circuit 330 through the eighth port P8, the ninth port P9, and the tenth port P10 and .

The third circuit 330 may belong to a third power domain PD3. The third circuit 330 may be connected with the bus 301 through a sixth port P6 and a seventh port P7 and may communicate with the bus 301 through the sixth port P6 the seventh port P7. The third circuit 330 may be connected with the second circuit 320 through the eighth port P8, the ninth port P9, and the tenth port P10 and may communicate with the second circuit 320 through the eighth port P8, the ninth port P9, and the tenth port P10.

The first power domain PD1, the second power domain PD2, and the third power domain PD3 may be independently powered off or powered on. When the first power domain PD1 is powered off, signal values of the first port P1, the second port P2, and the third port P3 connected with the bus 301 may be set to an isolation value (e.g., logic '1" or logic "0"). When the isolation value of the first port P1, the second port P2, or the third port P3 is abnormally set, an error may occur at the first port P1, the second port P2, or the third port P3 when the first power domain PD1 is powered off.

Figure 4:
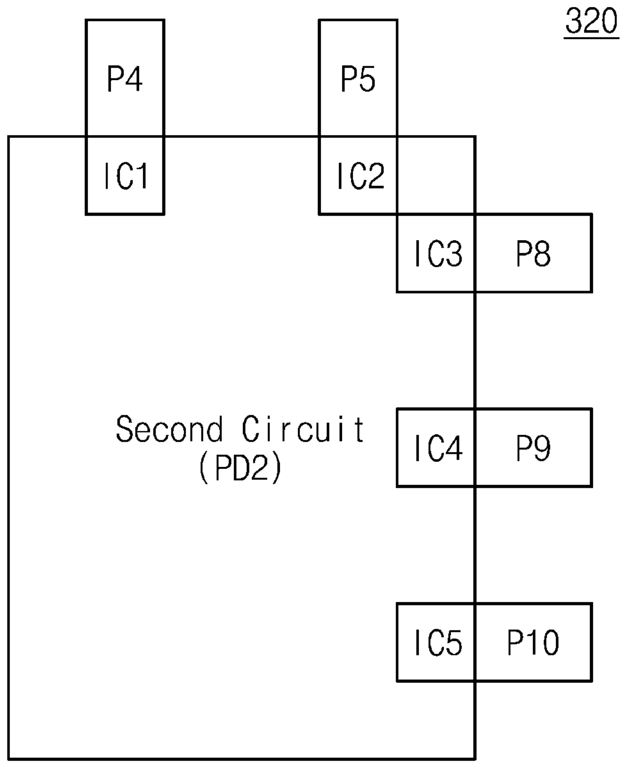
FIG. 4 is a diagram illustrating an example where isolation cells are provided in a second circuit.

When the second power domain PD2 is powered off, signal values of the fourth port P4 and the fifth port P5 connected with the bus 301 and signal values of the eighth port P8, the ninth port P9, and the tenth port P10 connected with the third circuit 330 may be set to the isolation value (e.g., logic '1" or logic "0"). When the isolation value of the fourth port P4, the fifth port P5, the eighth port P8, the ninth port P9, or the tenth port P10 is abnormally set, an error may occur at the fourth port P4, the fifth port P5, the eighth port P8, the ninth port P9, or the tenth port P10 when the second power domain PD2 is powered off Likewise, when the third power domain PD3 is powered off, signal values of the sixth port P6 and the seventh port P7 connected with the bus 301 and signal values of the eighth port P8, the ninth port P9, and the tenth port P10 connected with the second circuit 320 may be set to the isolation value (e.g., logic '1" or logic "0"). When the isolation value of the sixth port P6, the seventh port P7, the eighth port P8, the ninth port P9, or the tenth port P10 is abnormally set, an error may occur at the sixth port P6, the seventh port P7, the eighth port P8, the ninth port P9, or the tenth port P10 when the third power domain PD3 is powered off FIG. 4 is a diagram illustrating an example where isolation cells are provided in the second circuit 320. Referring to FIGS. 3 and 4, isolation cells may be provided at ports through which the second circuit 320 communicates with circuits of any other power domain. For example, a first isolation cell IC1 may be provided at the fourth port P4, and a second isolation cell IC2 may be provided at the fifth port P5. Moreover, a third isolation cell IC3 may be provided at the eighth port P8, a fourth isolation cell IC4 may be provided at the ninth port P9, and a fifth isolation cell IC5 may be provided at the tenth port P10.

When the second power domain PD2 is powered off, an isolation cell connected with an output port outputting a signal from the second circuit 320 may output an isolation value to the outside. When a power domain in which there is included a circuit communicating the second circuit 320 is powered off, an isolation cell connected with an input port transferring a signal to the inside of the second circuit 320 may output the isolation value to the inside.

Figure 5:
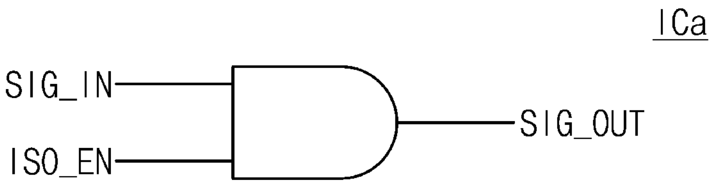
FIG. 5 is a diagram illustrating an isolation cell according to a first example.

FIG. 5 is a diagram illustrating an isolation cell ICa according to a first example. Referring to FIG. 5, the isolation cell ICa may include an AND gate. An input signal SIG_IN may be transferred to a first input of the AND gate. An isolation enable signal ISO_EN may be transferred to a second input of the AND gate. An output of the AND gate may be an output signal SIG_OUT.

When the isolation cell ICa is provided with regard to the input port, the input signal SIG_IN may be transferred through a port from an external circuit, and the output signal SIG_OUT may be transferred to an internal circuit. When the isolation cell ICa is provided with regard to the output port, the input signal SIG_IN may be transferred from an internal circuit, and the output signal SIG_OUT may be transferred to an external circuit through a port. In an example embodiment, a circuit that includes the isolation cell ICa may be the internal circuit, and a circuit that does not include the isolation cell ICa may be the external circuit.

When the isolation enable signal ISO_EN is activated to the low level, the output signal SIG_OUT maintains the low level regardless of the input signal SIG_IN. That is, the isolation cell ICa may set the signal value of the port to the isolation value of the low level.

Figure 6:
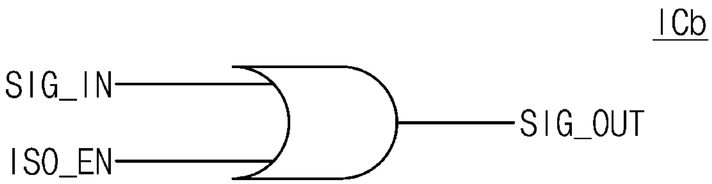
FIG. 6 is a diagram illustrating an isolation cell according to a second example.

FIG. 6 is a diagram illustrating an isolation cell ICb according to a second example. Referring to FIG. 6, the isolation cell ICb may include an OR gate. The input signal SIG_IN may be transferred to a first input of the OR gate. The isolation enable signal ISO_EN may be transferred to a second input of the OR gate. An output of the OR gate may be the output signal SIG_OUT.

When the isolation cell ICb is provided with regard to the input port, the input signal SIG_IN may be transferred through a port from the external circuit, and the output signal SIG_OUT may be transferred to the internal circuit. When the isolation cell ICb is provided with regard to the output port, the input signal SIG_IN may be transferred from the internal circuit, and the output signal SIG_OUT may be transferred to the external circuit through a port. In an example embodiment, a circuit that includes the isolation cell ICb may be the internal circuit, and a circuit that does not include the isolation cell ICb may be the external circuit.

When the isolation enable signal ISO_EN is activated to the high level, the output signal SIG_OUT maintains the high level regardless of the input signal SIG_IN. That is, the isolation cell ICb may set the signal value of the port to the isolation value of the high level.

Figure 7:
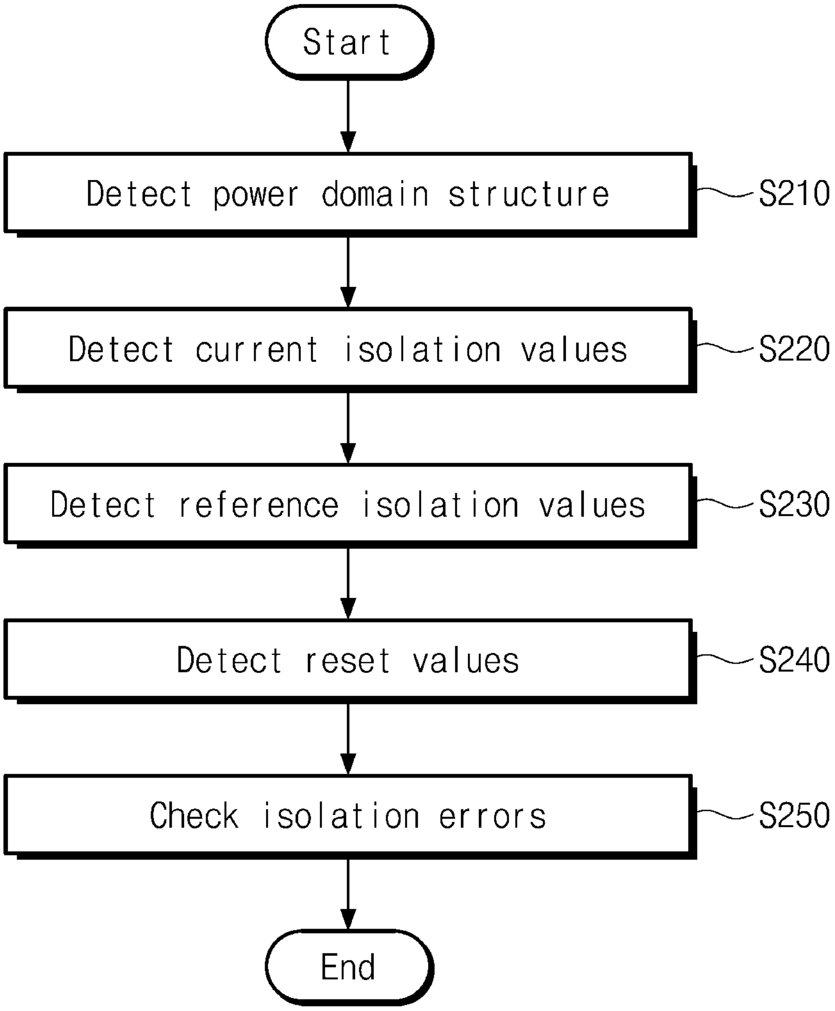
FIG. 7 is a diagram illustrating an example of a method where a simulation module executable by processors checks errors of isolation cells according to an example embodiment.
Figure 8:
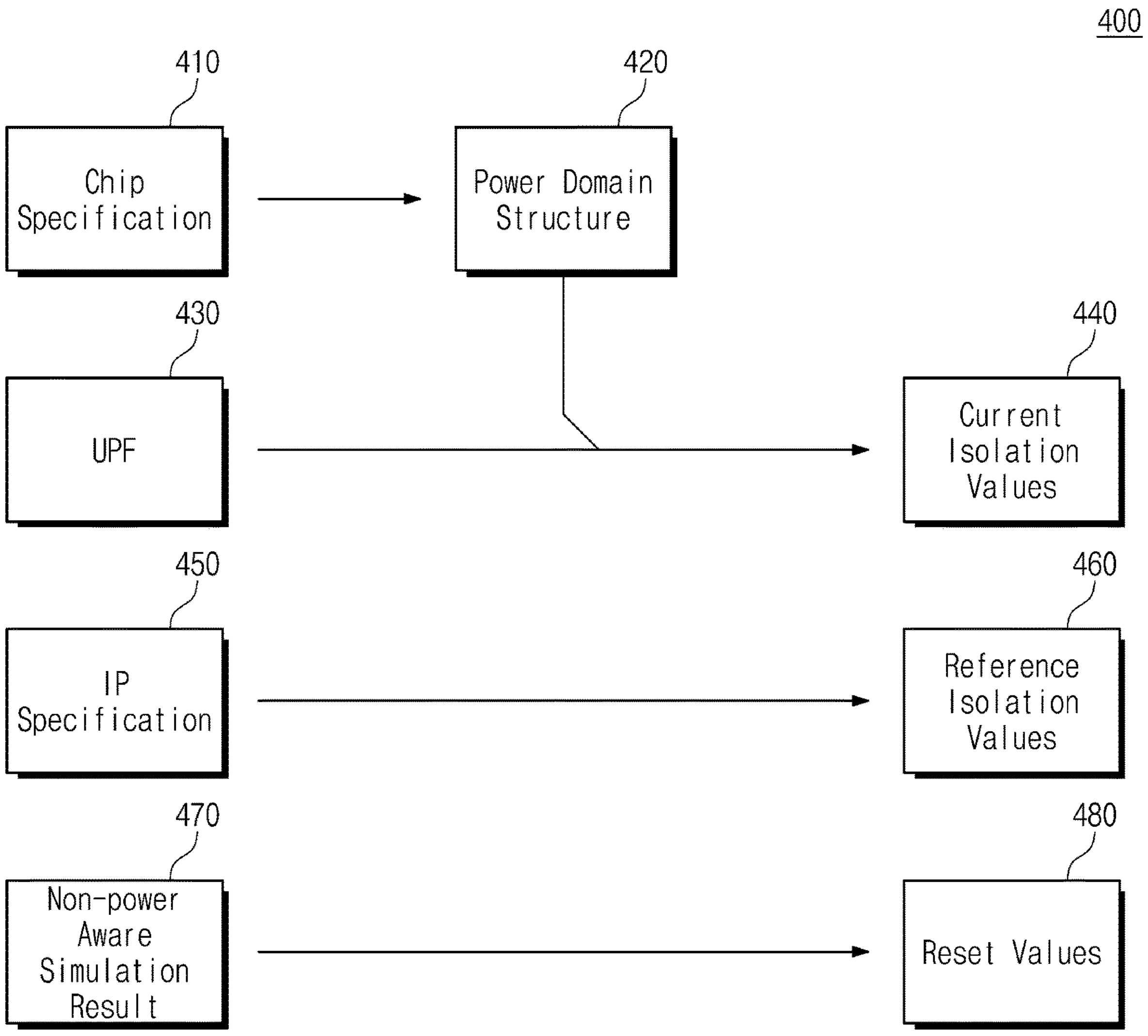
FIG. 8 is a diagram illustrating an example of information that a simulation module executed by processors uses in the process of checking errors of isolation cells according to an example embodiment.

FIG. 7 is a diagram illustrating an example of a method where the simulation module 200 executed by one or more of the processors 110 checks errors of isolation cells according to an example embodiment. FIG. 8 is a diagram illustrating an example of information that the simulation module 200 executed by one or more of the processors 110 uses in the process of checking errors of isolation cells according to an example embodiment.

Referring to FIGS. 7 and 8, in operation S210, the simulation module 200 executed by one or more of the processors 110 may detect a power domain structure 420. For example, the simulation module 200 executed by the one or more of processors 110 may detect the power domain structure 420 from a chip specification 410. The chip specification 410 may include information about an integrated circuit and may include information about a configuration of IP circuits and power domains of the IP circuits. The power domain structure 420 may be input through the user interfaces 160 or may be received through the modem 150.

In operation S220, the simulation module 200 executed by one or more of the processors 110 may detect isolation values. For example, the simulation module 200 executed by one or more of the processors 110 may detect current isolation values 440 from the power domain structure 420 and an UPF 430. The simulation module 200 executed by one or more of the processors 110 may detect ports, which exchange signals between power domains, from the power domain structure 420 and may detect currently defined isolation values of the detected ports from the UPF 430. For example, the simulation module 200 executed by one or more of the processors 110 may detect the current isolation values 440 by parsing an iso.log file generated by performing compile on the RTL model and the UPF by a compiler. For example, a complier such as "ncverilog" or a similar compiler may be used.

In operation S230, the simulation module 200 executed by one or more of the processors 110 may detect reference isolation values 460. For example, the simulation module 200 executed by one or more of the processors 110 may detect the reference isolation values from an IP specification 450. However, the disclosure is not limited thereto, and as such, according to another example embodiment, the simulation module 200 executed by one or more of the processors 110 may detect the reference isolation values from a power domain specification. The IP specification 450 (or the power domain specification) may be provided by the IP manufacturer or may include isolation values of ports detected by the experience. In an example embodiment, the reference isolation values may be provided with regard to all the ports (e.g., ports between different power domains), or may be provided only with regard to some ports (e.g., the ports between the different power domains).

In operation S240, the simulation module 200 executed by one or more of the processors 110 may detect reset values 480. For example, the simulation module 200 executed by one or more of the processors 110 may detect signal values when the ports (e.g., the ports between the different power domains) are in a reset state. For example, the simulation module 200 executed by one or more of the processors 110 may detect the reset values 480 of the ports (e.g., the ports between the different power domains) from a result of the first simulation being the non-power-aware simulation.

According to an example embodiment, the simulation module 200 executed by one or more of the processors 110 may detect the reset values 480 by parsing a report including all the reset values output from file system debugger, such as "fsdb", which is a dump format of "Synopsis Verdi®".

The reset values 480 of the ports may indicate signal levels at which ports of a circuit to which the isolation cell belongs do not affect circuits of any other power domain. That is, the reset values 480 of the ports may be regarded as isolation values at which the ports do not affect any other circuits.

In operation 250, the simulation module 200 executed by one or more of the processors 110 may check isolation errors. For example, the simulation module 200 executed by one or more of the processors 110 may check the isolation errors by comparing the current isolation values, the reference isolation values, and/or the reset values.

Figure 9:
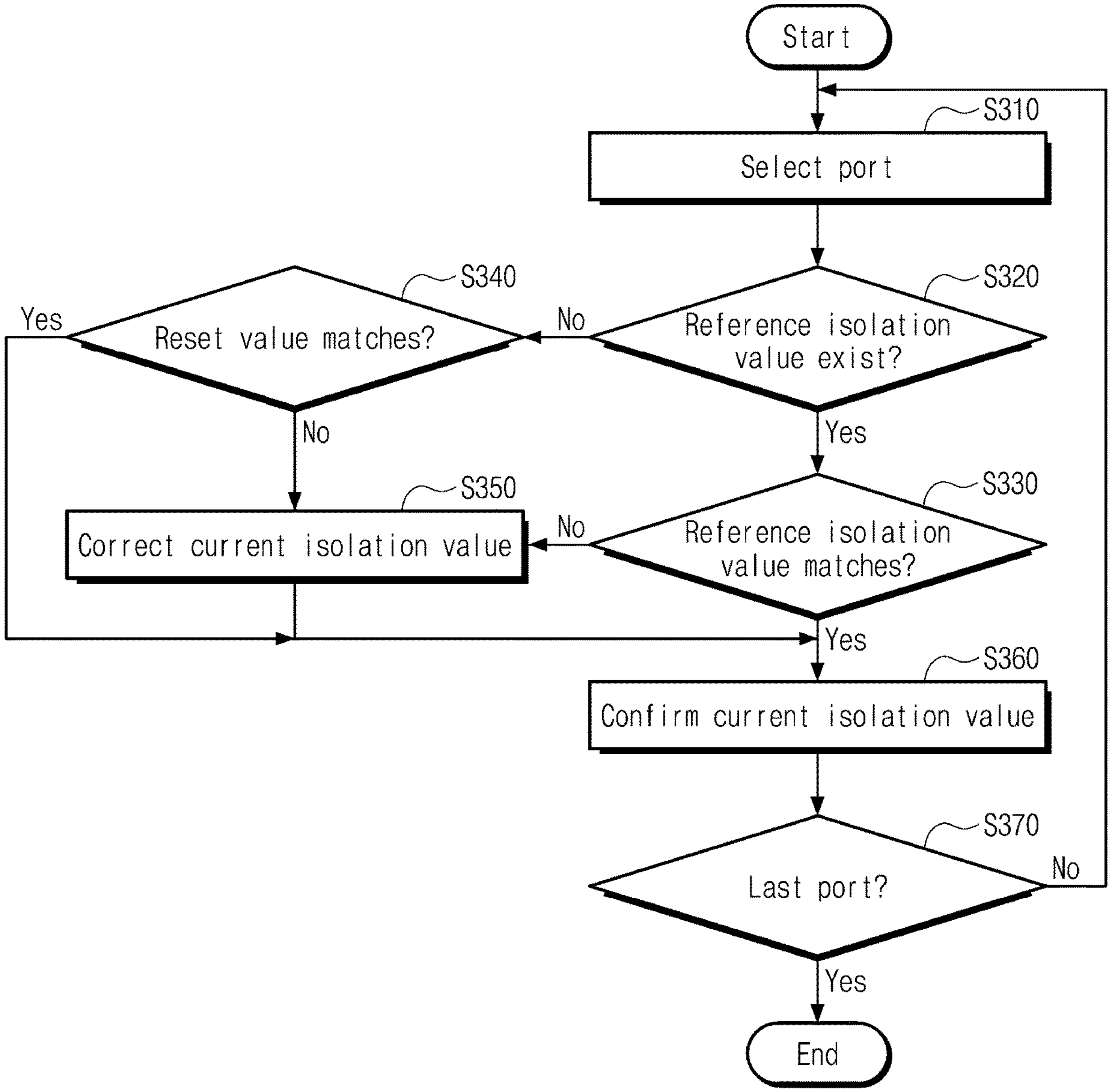
FIG. 9 is a diagram illustrating an example of a method where a simulation module executable by processors checks isolation errors according to an example embodiment.

FIG. 9 is a diagram illustrating an example of a method where the simulation module 200 executed by one or more of the processors 110 checks isolation errors. Referring to FIGS. 1 and 9, in operation S310, the simulation module 200 executed by one or more of the processors 110 may select one of ports between different power domains.

In operation S320, the simulation module 200 executed by one or more of the processors 110 may determine whether a reference isolation value associated with the selected port exists. When the reference isolation value associated with the selected port exists, in operation S330, the simulation module 200 executed by one or more of the processors 110 may determine whether the reference isolation value is identical to a current isolation value. For example, the simulation module 200 executed by one or more of the processors 110 may determine whether the reference isolation value matches (or matches with) a current isolation value. When the reference isolation value is identical to (e.g., matched with) the current isolation value, in operation S360, the simulation module 200 executed by one or more of the processors 110 may confirm the current isolation value.

When it is determined in operation S330 that the reference isolation value is not identical to (e.g., does not matched with) the current isolation value, in operation S350, the simulation module 200 executed by one or more of the processors 110 may correct (e.g., invert) the current isolation value. Thereafter, in operation S360, the simulation module 200 executed by one or more of the processors 110 may confirm the current isolation value.

When it is determined in operation S320 that the reference isolation value associated with the selected port does not exist, in operation S340, the simulation module 200 executed by one or more of the processors 110 may determine whether a reset value associated with the selected port is identical to (e.g., matched with) the current isolation value. When the reset value associated with the selected port is identical to (e.g., matched with) the current isolation value, in operation S360, the simulation module 200 executed by one or more of the processors 110 may confirm the current isolation value.

When it is determined in operation S340 that the reference isolation value is not identical to (e.g., not matched with) the current isolation value, in operation S350, the simulation module 200 executed by one or more of the processors 110 may correct (e.g., invert) the current isolation value. Thereafter, in operation S360, the simulation module 200 executed by one or more of the processors 110 may confirm the current isolation value.

After the current isolation value is confirmed in operation S360, the simulation module 200 executed by one or more of the processors 110 may determine whether the currently selected port is the last port. That is, the simulation module 200 executed by one or more of the processors 110 may determine current isolation values of all the ports between different power domains are confirmed. When the currently selected port is not the last port, that is, when the current isolation values of all the ports between different power domains are not confirmed, in operation S310, the simulation module 200 executed by one or more of the processors 110 may select a next port (i.e., a port placed between the different power domains and whose isolation value is not confirmed). Thereafter, in operation S320 to operation S360, the simulation module 200 executed by one or more of the processors 110 may check, correct, and/or confirm the current isolation value of the next port.

When the currently selected port is the last port, that is, when the current isolation values of all the ports between different power domains are confirmed, the simulation module 200 executed by one or more of the processors 110 may terminate checking the isolation errors.

As described above, the simulation module 200 executed by one or more of the processors 110 may check, correct, and compare the current isolation values of the ports between the different power domains. According to an example embodiment, when the isolation errors are checked, the reference isolation values may be preferentially referenced, but when there are no reference isolation values, the reset values may be used as a supplement or in place of the reference isolation values. However, the disclosure is not limited thereto.

The check of the isolation errors according to an example embodiment of the disclosure is based on a static check for comparing numerical values, not a dynamic check such as simulation. Accordingly, the time and computational resources necessary to check the isolation errors may be reduced.

Figure 10:
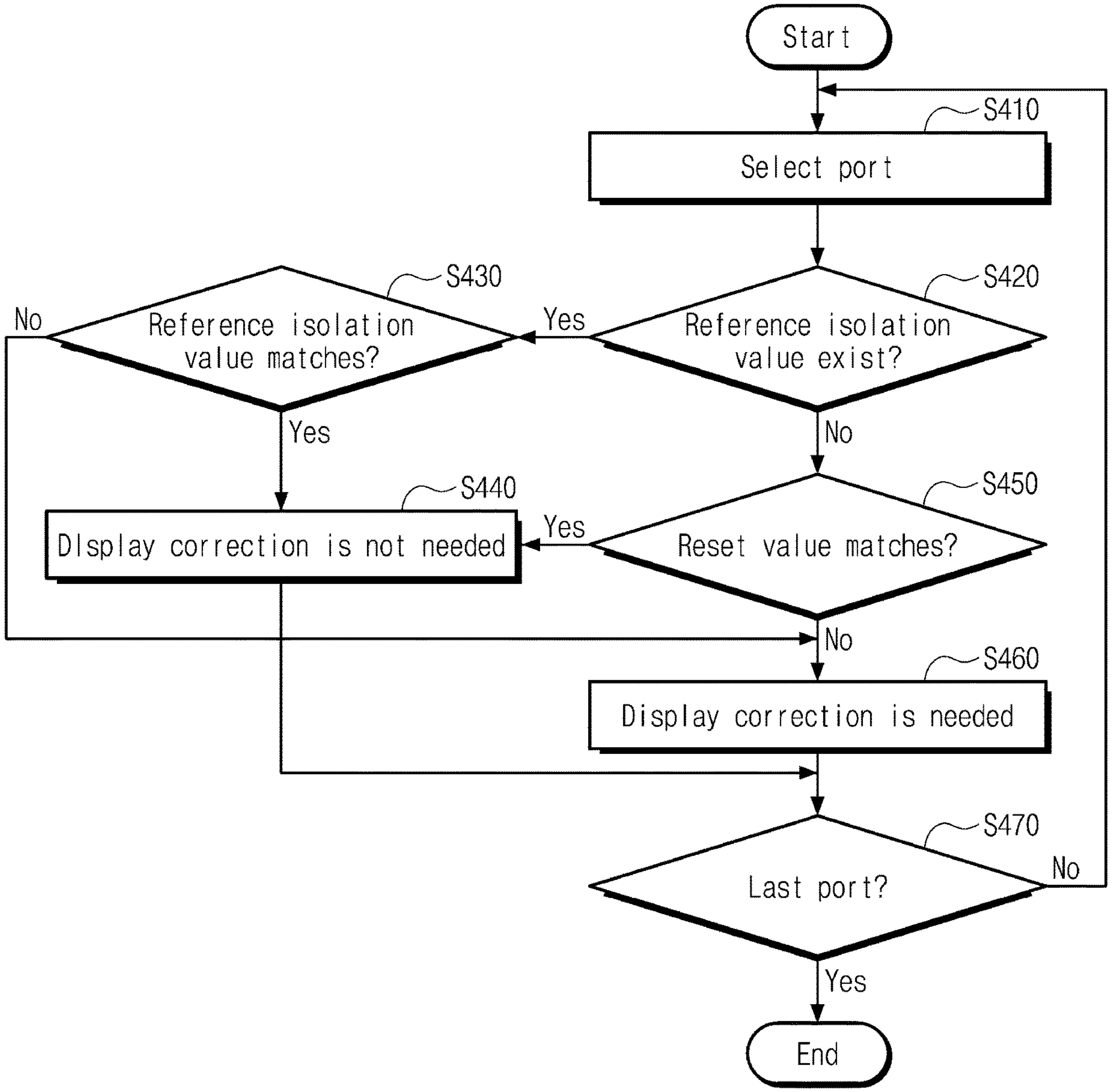
FIG. 10 is a diagram illustrating a second example of a method where a simulation module executable by processors checks isolation errors according to an example embodiment.

FIG. 10 is a diagram illustrating a second example of a method where the simulation module 200 executed by one or more of the processors 110 checks isolation errors according to an example embodiment. Referring to FIGS. 1 and 10, in operation S410, the simulation module 200 executed by one or more of the processors 110 may select one of ports between different power domains.

In operation S420, the simulation module 200 executed by one or more of the processors 110 may determine whether a reference isolation value associated with the selected port exists. When the reference isolation value associated with the selected port exists, in operation S430, the simulation module 200 executed by one or more of the processors 110 may determine whether the reference isolation value is identical to (e.g., matched with) a current isolation value. When the reference isolation value is identical to (e.g., matched with) the current isolation value, in operation S440, the simulation module 200 executed by one or more of the processors 110 may display that there is no need to correct the current isolation value (e.g., through the user interfaces 160).

When it is determined in operation S430 that the reference isolation value is not identical to (e.g., not matched with) the current isolation value, in operation S460, the simulation module 200 executed by one or more of the processors 110 may display that there is a need to correct the current isolation value (e.g., through the user interfaces 160).

When it is determined in operation S420 that the reference isolation value associated with the selected port does not exist, in operation S450, the simulation module 200 executed by one or more of the processors 110 may determine whether a reset value associated with the selected port is identical to (e.g., matched with) the current isolation value. When the reset value associated with the selected port is identical to (e.g., matched with) the current isolation value, in operation 440, the simulation module 200 executed by one or more of the processors 110 may display that there is no need to correct the current isolation value (e.g., through the user interfaces 160).

When it is determined in operation S450 that the reset value associated with the selected port is not identical to (e.g., not matched with) the current isolation value, in operation S460, the simulation module 200 executed by one or more of the processors 110 may display that there is a need to correct the current isolation value (e.g., through the user interfaces 160).

After displaying that there is a need to correct the current isolation value (S460) or that there is no need to correct the current isolation value (S440), in operation S470, the simulation module 200 executed by one or more of the processors 110 may determine whether the currently selected port is the last port. That is, the simulation module 200 executed by one or more of the processors 110 may determine current isolation values of all the ports between different power domains are confirmed. When the currently selected port is not the last port, that is, when the current isolation values of all the ports between different power domains are not confirmed, in operation S410, the simulation module 200 executed by one or more of the processors 110 may select a next port (i.e., a port placed between the different power domains and whose isolation value is not confirmed). Thereafter, in operation S420 to operation S460, the simulation module 200 executed by one or more of the processors 110 may check a current isolation value of the next port and may display whether there is a need to correct the current isolation value or whether there is no need to correct the current isolation value.

When the currently selected port is the last port, that is, when whether there is a need to correct the current isolation values of all the ports between different power domains is checked, the simulation module 200 executed by one or more of the processors 110 may terminate checking the isolation errors.

As described above, the simulation module 200 executed by one or more of the processors 110 may check the current isolation values of the ports between the different power domains and may display whether the correction is needed or whether the correction is not needed. When the isolation errors are checked, the reference isolation values may be preferentially referenced, but when there are no reference isolation values, the reset values may be used as a supplement or in place of the reference isolation values. However, the disclosure is not limited thereto.

In an example embodiment, the simulation module 200 executed by one or more of the processors 110 may collect information about whether there is a need to correct the isolation values of the ports or whether there is no need to correct the isolation values of the ports and may then display the collected information at the same time. The simulation module 200 executed by one or more of the processors 110 may display the current isolation value requiring the correction together with a notification (e.g., a visual or auditory notification).

The check of the isolation errors according to an example embodiment of the disclosure is based on a static check for comparing numerical values, not a dynamic check such as simulation. Accordingly, the time and computational resources necessary to check the isolation errors may be reduced.

Figure 11:
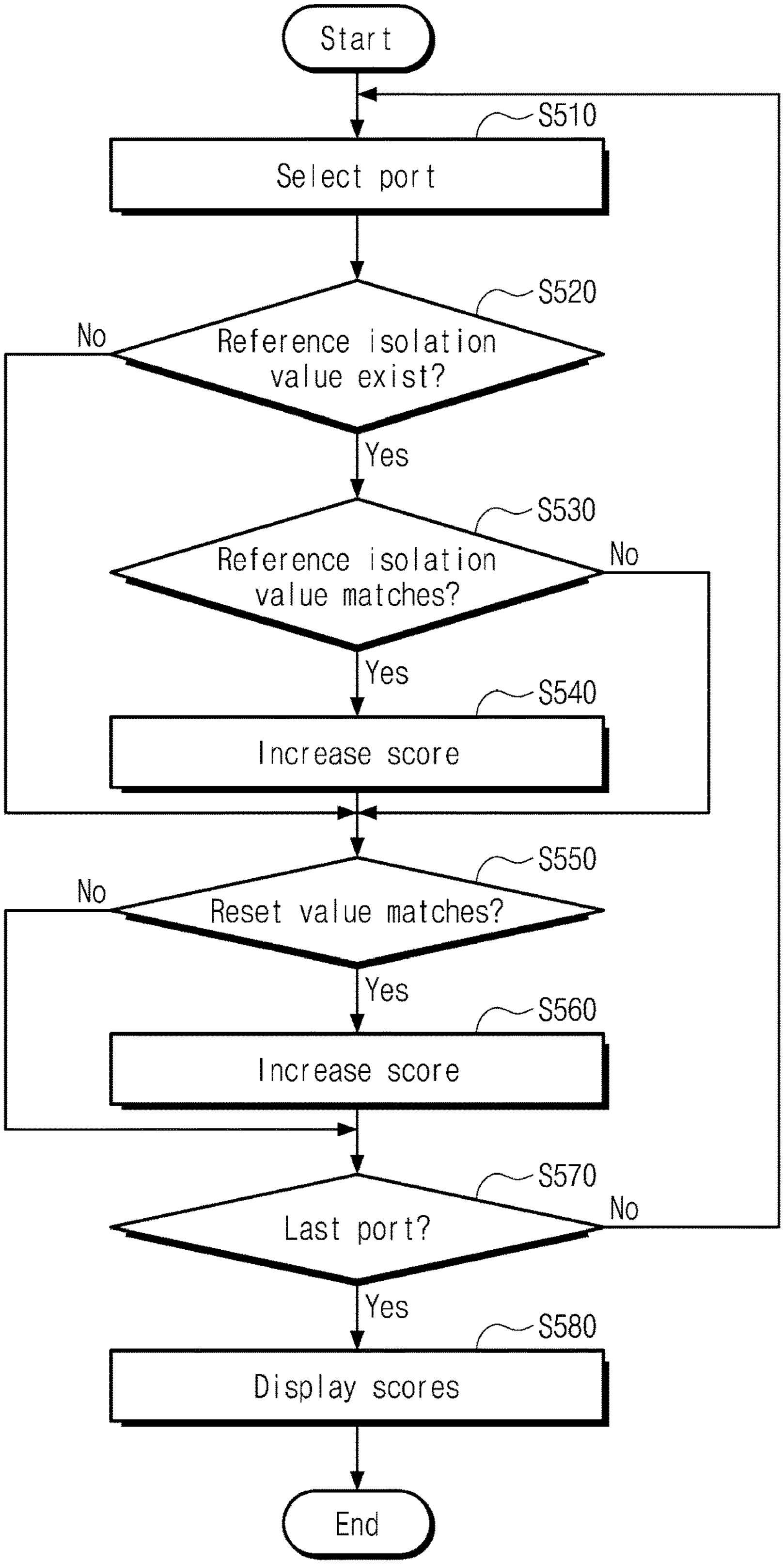
FIG. 11 is a diagram illustrating a third example of a method where a simulation module executable by processors checks isolation errors according to an example embodiment.

FIG. 11 is a diagram illustrating a third example of a method where the simulation module 200 executed by one or more of the processors 110 checks isolation errors. Referring to FIGS. 1 and 11, in operation S510, the simulation module 200 executed by one or more of the processors 110 may select one of ports between different power domains.

In operation S520, the simulation module 200 executed by one or more of the processors 110 may determine whether a reference isolation value associated with the selected port exists. When the reference isolation value associated with the selected port exists, in operation S530, the simulation module 200 executed by one or more of the processors 110 may determine whether the reference isolation value is identical to (e.g., matched with) a current isolation value. When the reference isolation value is identical to (e.g., matched with) the current isolation value, in operation S540, the simulation module 200 executed by one or more of the processors 110 may increase a score associated with the current isolation value of the selected port and may proceed to operation S550.

When it is determined in operation S530 that the reference isolation value is not identical to (e.g., not matched with) the current isolation value, the simulation module 200 executed by one or more of the processors 110 may not increase the score associated with the current isolation value of the selected port (e.g., may omit operation S540) and may proceed to operation S550.

When it is determined in operation S520 that the reference isolation value associated with the selected port does not exist, the simulation module 200 executed by one or more of the processors 110 may not determine whether to increase the score associated with the current isolation value of the selected port based on the reference isolation value (e.g., may omit operation S530 and operation S540) and may proceed to operation S550.

In operation S550, the simulation module 200 executed by one or more of the processors 110 may determine whether a reset value associated with the selected port is identical to (e.g., matched with) the current isolation value. When the reset value associated with the selected port is identical to (e.g., matched with) the current isolation value, in operation S560, the simulation module 200 executed by one or more of the processors 110 may increase the score associated with the current isolation value of the selected port and may proceed to operation S570.

When it is determined in operation S550 that the reset value associated with the selected port is not identical to (e.g., not matched with) the current isolation value, the simulation module 200 executed by one or more of the processors 110 may not increase the score associated with the current isolation value of the selected port (e.g., may omit operation S560) and may proceed to operation S570.

After the scoring is completed based on the reference isolation value and the reset value, in operation S570, the simulation module 200 executed by one or more of the processors 110 may determine whether the currently selected port is the last port. That is, the simulation module 200 executed by one or more of the processors 110 may determine current isolation values of all the ports between different power domains are confirmed. When the currently selected port is not the last port, that is, when the current isolation values of all the ports between different power domains are not confirmed, in operation S510, the simulation module 200 executed by one or more of the processors 110 may select a next port (i.e., a port placed between the different power domains and whose isolation value is not confirmed). Thereafter, in operation S520 to operation S560, the simulation module 200 executed by one or more of the processors 110 may check the current isolation value of the next port and may count the score.

When the currently selected port is the last port, that is, when scores of the current isolation values of all the ports between the different power domains are collected, the simulation module 200 executed by one or more of the processors 110 may terminate checking the isolation errors.

As described above, the simulation module 200 executed by one or more of the processors 110 may check the current isolation values of the ports between the different power domains and may display whether the correction is needed or whether the correction is not needed. When the isolation errors are checked, the reference isolation values and the reset values may be considered with the equivalent weight. Alternatively, when the isolation errors are checked, different weights may be applied to the score based on the reference isolation values and the score based on the reset values.

In an example embodiment, the simulation module 200 executed by one or more of the processors 110 may collect the scores of the isolation values of the ports and may then display the collected scores at the same time. The simulation module 200 executed by one or more of the processors 110 may display the current isolation value whose score is smaller than a threshold value, together with a notification (e.g., a visual or auditory notification).

The check of the isolation errors according to an example embodiment of the disclosure is based on a static check for comparing numerical values, not a dynamic check such as simulation. Accordingly, the time and computational resources necessary to check the isolation errors may be reduced.

FIG. 12 is a diagram illustrating an example of a method where the simulation module 200 executed by one or more of the processors 110 shows a result of checking isolation errors. Referring to FIGS. 1 and 12, the simulation module 200 executed by one or more of the processors 110 may display an isolation error check result in the form of a table. The table may include a port identifier, a current isolation value corresponding to the port identifier, a reference isolation value corresponding to the port identifier, and a reset value corresponding to the port identifier.

The reference isolation value corresponding to the port identifier may be displayed together with information about whether the reference isolation value is identical to (i.e., matched with) the current isolation value. The reset value corresponding to the port identifier may be displayed together with information about whether the reset value is identical to (i.e., matched with) the current isolation value.

Figure 13:
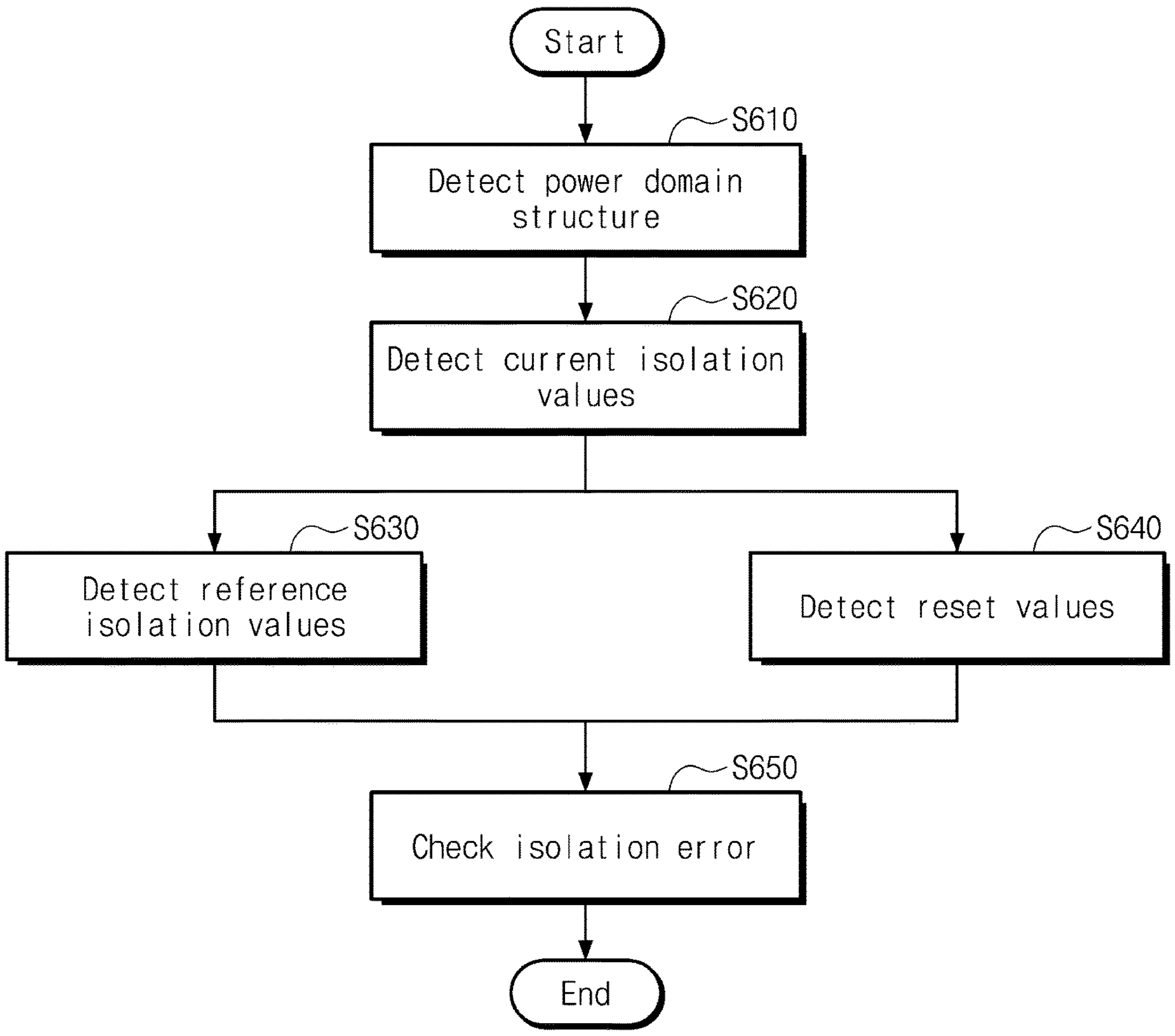
FIG. 13 is a diagram illustrating another example of a method where a simulation module executed by processors checks errors of isolation cells according to an example embodiment.

FIG. 13 is a diagram illustrating a method where the simulation module 200 executed by one or more of the processors 110 checks errors of isolation cells according to another example embodiment.

Referring to FIGS. 1, 8 and 13, in operation S610, the simulation module 200 executed by one or more of the processors 110 may detect the power domain structure 420. Operation S610 may be identical to operation S210 of FIG. 7. The description given with reference to operation S210 of FIG. 7 may be identically applied to operation S610 of FIG. 13.

In operation S620, the simulation module 200 executed by one or more of the processors 110 may detect isolation values. Operation S620 may be identical to operation S220 of FIG. 7. The description given with reference to operation S220 of FIG. 7 may be identically applied to operation S620 of FIG. 13.

The simulation module 200 executed by one or more of the processors 110 may perform either operation S630 or operation S640. For example, the simulation module 200 executed by one or more of the processors 110 may perform either operation S630 or operation S640 depending on an operation mode set by the user of the electronic device 100.

In operation S630, the simulation module 200 executed by one or more of the processors 110 may detect reference isolation values 460. Operation S630 may be identical to operation S230 of FIG. 7. The description given with reference to operation S230 of FIG. 7 may be identically applied to operation S630 of FIG. 13.

In operation S640, the simulation module 200 executed by one or more of the processors 110 may detect reset values 480. Operation S640 may be identical to operation S240 of FIG. 7. The description given with reference to operation S240 of FIG. 7 may be identically applied to operation S640 of FIG. 13.

In operation S650, the simulation module 200 executed by one or more of the processors 110 may check isolation errors. For example, when the reference isolation values are detected in operation S630, the simulation module 200 executed by one or more of the processors 110 may detect the isolation error by comparing the reference isolation value and the current isolation value. In FIGS. 7 to 12, the descriptions provided with regard to the comparison of the current isolation value with the reference isolation value may be identically applied to FIG. 13.

When the reset values are detected in operation S640, the simulation module 200 executed by one or more of the processors 110 may detect the isolation error by comparing the reset value and the current isolation value. In FIGS. 7 to 12, the descriptions provided with regard to the comparison of the current isolation value with the reset value may be identically applied to FIG. 13.

In the above example embodiments, components according to the disclosure are described by using the terms "first", "second", "third", etc. However, the terms "first", "second", "third", etc. may be used to distinguish components from each other and do not limit the disclosure. For example, the terms "first", "second", "third", etc. do not involve an order or a numerical meaning of any form.

In the above example embodiments, components according to example embodiments of the disclosure are referenced by using modules or units. The modules or units may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the modules or units may include circuits implemented with semiconductor elements in an integrated circuit, or circuits enrolled as an intellectual property (IP).

According to the disclosure, an electronic device that simulates the design of the integrated circuit may check an isolation error by comparing current isolation values, reference isolation values, and reset values. Accordingly, an operating method of an electronic device that quickly checks an isolation error is provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An operating method of an electronic device including at least one processor, which simulates a design of an integrated circuit, the method comprising:

obtaining, by the at least one processor, a power domain structure of the integrated circuit from a register transfer level (RTL) model of the integrated circuit;

obtaining, by the at least one processor, current isolation values of a plurality of ports of the integrated circuit from the power domain structure of the integrated circuit and an unified power format (UPF) of the integrated circuit;

obtaining, by the at least one processor, reference isolation values of the plurality of ports of the integrated circuit;

obtaining, by the at least one processor, reset values of the plurality of ports of the integrated circuit; and checking, by the at least one processor, isolation errors of the plurality of ports of the integrated circuit based on the current isolation values, the reference isolation values, and the reset values.

2. The method of claim 1, wherein the plurality of ports of the integrated circuit comprise a port for transferring a signal between a first power domain circuit and a second power domain circuit of the power domain structure.

3. The method of claim 1, wherein the plurality of ports of the integrated circuit comprise a port for transferring a signal between a power domain circuit of the power domain structure and a bus.

4. The method of claim 1, wherein the obtaining the reference isolation values of the plurality of ports of the integrated circuit comprises:

obtaining the reference isolation values from specifications of power domains of the power domain structure.

5. The method of claim 1, wherein the obtaining the reset values of the plurality of ports of the integrated circuit comprises:

obtaining the reset values of the plurality of ports of the integrated circuit from a result of a non-power-aware simulation of the integrated circuit.

6. The method of claim 1, wherein the checking the isolation errors of the plurality of ports of the integrated circuit comprises:

based on an existence of a reference isolation value corresponding to a first port, from among the plurality of ports of the integrated circuit, comparing the reference isolation value of the first port with a current isolation value of the first port, .

7. The method of claim 6, wherein the checking the isolation errors of the plurality of ports of the integrated circuit further comprises:

based on the reference isolation value of the first port being identical to the current isolation value of the first port, confirming the current isolation value of the first port.

8. The method of claim 6, wherein the checking the isolation errors of the plurality of ports of the integrated circuit further comprises:

based on the reference isolation value of the first port being different from the current isolation value of the first port, correcting the current isolation value of the first port.

9. The method of claim 1, wherein the checking the isolation errors of the plurality of ports of the integrated circuit further comprises:

based on a non-existence of the reference isolation value corresponding to a first port from among the plurality of ports of the integrated circuit, comparing a reset value of the first port with a current isolation value of the first port.

10. The method of claim 9, wherein the checking the isolation errors of the plurality of ports of the integrated circuit further comprises:

based on the reference isolation value of the first port being identical to the current isolation value of the first port, displaying that a correction of the current isolation value of the first port is not needed.

11. The method of claim 9, wherein the checking the isolation errors of the plurality of ports of the integrated circuit further comprises:

based on the reference isolation value of the first port being different from the current isolation value of the first port, displaying that a correction of the current isolation value of the first port is necessary.

12. The method of claim 9, wherein the checking the isolation errors of the plurality of ports of the integrated circuit further comprises:

based on the reference isolation value of the first port being identical to the current isolation value of the first port, increasing a score of the first port.

13. The method of claim 1, wherein the checking the isolation errors of the plurality of ports of the integrated circuit further comprises:

comparing a reset value of a first port from among the plurality of ports of the integrated circuit with a current isolation value of the first port.

14. The method of claim 13, wherein the checking the isolation errors of the plurality of ports of the integrated circuit further comprises:

based on the reset value of the first port being identical to the current isolation value of the first port, increasing a score of the first port.

15. The method of claim 1, wherein the checking the isolation errors of the plurality of ports of the integrated circuit further comprises:

displaying identifiers of the plurality of ports of the integrated circuit, the current isolation values, whether the current isolation values are identical to the reference isolation values, and whether the current isolation values are identical to the reset values.

16. The method of claim 15, wherein the checking the isolation errors of the plurality of ports of the integrated circuit further comprises:

displaying the reference isolation values and the reset values.

17. An operating method of an electronic device including at least one processor, which simulates a design of an integrated circuit, the method comprising:

obtaining, by the at least one processor, a power domain structure of the integrated circuit from a register transfer level (RTL) model of the integrated circuit;

obtaining, by the at least one processor, current isolation values of a plurality of ports of the integrated circuit from the power domain structure of the integrated circuit and an unified power format (UPF) of the integrated circuit;

obtaining, by the at least one processor, reference isolation values of the plurality of ports of the integrated circuit; and checking, by the at least one processor, isolation errors of the plurality of ports of the integrated circuit based on a difference between the current isolation values and the reference isolation values.

18. The method of claim 17, wherein the obtaining the reference isolation values of the plurality of ports of the integrated circuit includes:

obtaining the reference isolation values from specifications of power domains of the power domain structure.

19. An operating method of an electronic device including at least one processor, which simulates a design of an integrated circuit, the method comprising:

obtaining, by the at least one processor, a power domain structure of the integrated circuit from a register transfer level (RTL) model of the integrated circuit;

obtaining, by the at least one processor, current isolation values of a plurality of ports of the integrated circuit from the power domain structure of the integrated circuit and an unified power format (UPF) of the integrated circuit;

obtaining, by the at least one processor, reset values of the plurality of ports of the integrated circuit; and checking, by the at least one processor, isolation errors of the plurality of ports of the integrated circuit based on a difference between the current isolation values and the reset values.

20. The method of claim 19, wherein the obtaining the reset values of the plurality of ports of the integrated circuit includes:

obtaining the reset values of the plurality of ports of the integrated circuit from a result of a non-power-aware simulation of the integrated circuit.

* * * * *